US012608901B2

(12) United States Patent
Li et al.

(10) Patent No.: US 12,608,901 B2
(45) Date of Patent: Apr. 21, 2026

(54) BENDING ANGLE DETECTION METHOD AND SYSTEM FOR TUBE BENDING AND ELECTRONIC DEVICE

(71) Applicants: ZHEJIANG CHANGXING HELIANG INTELLIGENT EQUIPMENT CO., LTD, Zhejiang (CN); NANJING UNIVERSITY OF AERONAUTICS AND ASTRONAUTICS, Jiangsu (CN)

(72) Inventors: Liangyou Li, Zhejiang (CN); Zhengdong Zhou, Zhejiang (CN); Chunyan Peng, Zhejiang (CN); Lingwei Zhang, Zhejiang (CN); Liang Zhang, Zhejiang (CN); Yuanbin Wang, Zhejiang (CN); Weijiang Xi, Zhejiang (CN); Zefeng Song, Zhejiang (CN); Bing Lu, Zhejiang (CN); Yunfei Xu, Zhejiang (CN); Wentao Ji, Zhejiang (CN); Jiawen Wang, Zhejiang (CN); Yifan Zhou, Zhejiang (CN)

(73) Assignees: ZHEJIANG CHANGXING HELIANG INTELLIGENT EQUIPMENT CO., LTD, Zhejiang (CN); NANJING UNIVERSITY OF AERONAUTICS AND ASTRONAUTICS, Jiangsu (CN)

( * ) Notice: Subject to any disclaimer, the term of this patent is extended or adjusted under 35 U.S.C. 154(b) by 505 days.

(21) Appl. No.: 18/249,633

(22) PCT Filed: Mar. 6, 2023

(86) PCT No.: PCT/CN2023/079724
§ 371 (c)(1),
(2) Date: Apr. 19, 2023

(87) PCT Pub. No.: WO2024/124707
PCT Pub. Date: Jun. 20, 2024

(65) Prior Publication Data
US 2026/0017914 A1 Jan. 15, 2026

(30) Foreign Application Priority Data
Dec. 16, 2022 (CN) ......................... 202211621210.3

(51) Int. Cl.
*G06K 9/00* (2022.01)
*G06T 5/30* (2006.01)
(Continued)

(52) U.S. Cl.
CPC ................ *G06V 10/25* (2022.01); *G06T 5/30* (2013.01); *G06T 7/30* (2017.01); *G06V 10/28* (2022.01)

(58) Field of Classification Search
CPC .......... G06V 10/25; G06V 10/28; G06T 5/30; G06T 7/30; G06T 7/0004; G06T 7/136;
(Continued)

(56) References Cited

U.S. PATENT DOCUMENTS 6,163,374 A * 12/2000 Otani ................... G01B 11/024
348/136
2024/0233161 A1* 7/2024 Idomoto ............... G06T 7/0002

OTHER PUBLICATIONS

Yi, Zhong, Li Hao, and Fu Ling. "The measurement for sheet metal bending angle of crane boom based on image processing." 2013 Third International Conference on Instrumentation, Measurement, Computer, Communication and Control. IEEE, 2013. (Year: 2013).*

* cited by examiner

*Primary Examiner* — Gregory A Morse
*Assistant Examiner* — Owais I Memon
(74) *Attorney, Agent, or Firm* — GRUMBLES LAW PLLC; Brittany Haanan

(57) ABSTRACT
The present disclosure discloses a bending angle detection method for tube bending. The detection method includes the
(Continued)

following steps: binarizing a to-be-recognized image and extracting a region of interest (ROI) to obtain binary images of two linear segment regions, where the to-be-recognized image is an image of a bent tube; and calculating a bending angle according to the binary images of the two linear segment regions. The present disclosure provides an online method and system for measuring a bending angle based on images, which is cost-effective and has high efficiency and strong universality.

7 Claims, 3 Drawing Sheets

(51) Int. Cl.
  *G06T 7/30*    (2017.01)
  *G06V 10/25*   (2022.01)
  *G06V 10/28*   (2022.01)

(58) Field of Classification Search
  CPC ....... G06T 7/11; G06T 7/60; G06K 19/06037;
       G01B 11/26; B21D 5/006; B21D 5/02
  See application file for complete search history.

BENDING ANGLE DETECTION METHOD AND SYSTEM FOR TUBE BENDING AND ELECTRONIC DEVICE

CROSS REFERENCE TO RELATED APPLICATION

The present disclosure claims priority to the Chinese Patent Application No. 202211621210.3, filed with the China National Intellectual Property Administration (CNIPA) on Dec. 16, 2022, and entitled "BENDING ANGLE DETECTION METHOD AND SYSTEM FOR TUBE BENDING AND ELECTRONIC DEVICE", which is incorporated herein by reference in its entirety.

TECHNICAL FIELD

The present disclosure relates to the technical field of tube bending, and in particular, to a bending angle detection method and system for tube bending and an electronic device.

BACKGROUND

The tube bending machine is common equipment for metal tube bending and forming. Due to material spring-back, the actual bending angle is inaccurate, and the product quality is unstable, which reduces the qualified rate of tube bending products.

The tube bending and manufacturing process is detected using the online measurement technology to obtain the actual bending angle after each bending, which can effectively improve the detection efficiency of tube bending products. The detection system is connected with the control system, which can provide effective data for the timely adjustment of process parameters, so as to effectively improve the quality and qualified rate of tube bending products and reduce the cost.

In the prior art, the quality of tube bending products is usually detected offline according to the quality control procedures, which has low efficiency and is cost-ineffective. The processing process cannot be detected online, the production quality trend is unknown, and the unqualified rate is high. With the development of image processing and computer vision technologies, some methods for measuring bending angles using optical imaging technologies have been proposed in the field of tube bending and forming. For example, Katona et al. (Procedia CIRP, 2016) measured bending angles of a bent tube without contact using three-dimensional laser scanners. However, this equipment is cost-ineffective and time-consuming, which is difficult to meet the requirements of online detection of tube bending. Simonetto et al. (INT J ADV MANUF TECH, 2021) proposed a method for springback measurement by embedding an inertial measurement unit (IMU) into a mandrel. However, this method is only applicable to the tube bending using the mandrel.

SUMMARY

An objective of the present disclosure is to provide a bending angle detection method and system for tube bending and an electronic device, so as to provide a bending angle detection method and system which is cost-effective and has high efficiency and strong universality.

To achieve the above objective, the present disclosure provides the following technical solutions:

The present disclosure provides a bending angle detection method for tube bending, including the following steps:

binarizing a to-be-recognized image and extracting a region of interest (ROI) to obtain binary images of two linear segment regions, where the to-be-recognized image is an image of a bent tube; and calculating a bending angle according to the binary images of the two linear segment regions.

Optionally, a process of binarizing a to-be-recognized image and extracting an ROI to obtain binary images of two linear segment regions specifically includes:

registering the to-be-recognized image with a sample image in a tube bending image database to obtain a registration transformation matrix, where the tube bending image database includes a sample image obtained after each bending and translation in a tube bending process, and the sample image includes: a reference image, a labeled bent ROI, and two linear segment regions adjacent to current bending;

transforming coordinates of the bent ROI and the two linear segment regions adjacent to the current bending in the sample image using the transformation matrix to obtain a bent ROI and two linear segment regions adjacent to current bending in the to-be-recognized image;

intercepting the bent ROI in the to-be-recognized image from the to-be-recognized image to obtain an image of the bent ROI, and binarizing the image of the bent ROI to obtain a binary image of the bent ROI; and intercepting the two linear segment regions adjacent to the current bending in the to-be-recognized image from the binary image of the bent ROI to obtain binary images of the two linear segment regions.

Optionally, a process of calculating a bending angle according to the binary images of the two linear segment regions specifically includes:

thinning the image of the two linear segment regions;

performing linear fitting on two thinned pixel coordinates to obtain linear equations of two line segments; and calculating an included angle between the two line segments according to the linear equations of the two line segments to obtain the bending angle.

The present disclosure provides a bending angle detection system for tube bending, including:

an image processing module configured to binarize a to-be-recognized image and extract an ROI to obtain binary images of two linear segment regions, where the to-be-recognized image is an image of a bent tube; and a bending angle analysis module configured to calculate a bending angle according to the binary images of the two linear segment regions.

Optionally, the image processing module includes:

a registration unit configured to register the to-be-recognized image with a sample image in a tube bending image database to obtain a registration transformation matrix, where the to-be-recognized image is an image of a bent tube, the tube bending image database includes a sample image obtained after each bending and translation in a tube bending process, and the sample image includes: a reference image, a labeled bent ROI, and two linear segment regions adjacent to current bending;

a coordinate transformation unit configured to transform coordinates of the bent ROI and the two linear segment regions adjacent to the current bending in the sample image using the transformation matrix to obtain a bent ROI and two linear segment regions adjacent to current bending in the to-be-recognized image;

a bent ROI image extraction unit configured to intercept the bent ROI in the to-be-recognized image from the to-be-recognized image to obtain an image of the bent ROI;

a binarization unit configured to binarize the image of the bent ROI to obtain a binary image of the bent ROI; and a two linear segment region binary image extraction unit configured to intercept the two linear segment regions adjacent to the current bending in the to-be-recognized image from the binary image of the bent ROI to obtain binary images of the two linear segment regions.

Optionally, the bending angle analysis module specifically includes:

a thinning unit configured to thin the image of the two linear segment regions;

a linear fitting unit configured to perform linear fitting on two thinned pixel coordinates to obtain linear equations of two line segments; and a bending angle calculation unit configured to calculate an included angle between the two line segments according to the linear equations of the two line segments to obtain the bending angle.

The present disclosure provides an electronic device, including a memory arranged at each participant, a processor arranged at each participant, and a computer program stored on the memory and executable on the processor. When the processor executes the computer program, the above detection method is implemented.

The present disclosure provides an online detection method for tube bending, including the following steps:

obtaining control signals of tube bending from a control end of tube bending equipment;

determining whether image acquisition conditions are met according to the control signals, where the image acquisition conditions are that two adjacent control signals are bending and translation, and translation movement is ended;

returning to the step of "obtaining control signals of tube bending from a control end of tube bending equipment" when the image acquisition conditions are not met;

acquiring an image of a bent tube as a to-be-recognized image when the image acquisition conditions are met;

determining a bending angle based on the to-be-recognized image using the above detection method;

comparing the bending angle with a bending angle required by a tube bending technology to obtain a bending angle error; and feeding back the bending angle error to a control system of the tube bending equipment to adjust processing parameters.

Optionally, a process of acquiring an image of a bent tube as a to-be-recognized image specifically includes:

adjusting a position of an optical camera by an electronic control base, such that the optical camera is capable of obtaining an image containing a bent tube; and controlling the optical camera to acquire the image of the bent tube as the to-be-recognized image.

The present disclosure provides an online detection system for tube bending, including: an online control module, an image acquisition module, an image processing module, a bending angle analysis module, and an error feedback module.

The online control module is configured to perform the following steps:

obtaining control signals of tube bending from a control end of tube bending equipment; and determining whether image acquisition conditions are met according to the control signals, wherein the image acquisition conditions are that two adjacent control signals are bending and translation, and translation movement is ended.

The image acquisition module is configured to acquire an image of a bent tube as a to-be-recognized image when the image acquisition conditions are met.

The image processing module is configured to binarize the to-be-recognized image and extract an ROI to obtain binary images of two linear segment regions. The to-be-recognized image is the image of the bent tube.

The bending angle analysis module is configured to calculate a bending angle according to the binary images of the two linear segment regions.

The error feedback module is configured to compare the bending angle with a bending angle required by a tube bending technology to obtain a bending angle error, and feed back the bending angle error to a control system of the tube bending equipment to adjust processing parameters.

According to the specific embodiments provided by the present disclosure, the present disclosure provides the following technical effects:

The present disclosure discloses a bending angle detection method for tube bending. The detection method includes the following steps: binarizing a to-be-recognized image and extracting an ROI to obtain binary images of two linear segment regions, where the to-be-recognized image is an image of a bent tube; and calculating a bending angle according to the binary images of the two linear segment regions. The present disclosure provides an online method and system for measuring a bending angle based on images, which is cost-effective and has high efficiency and strong universality.

BRIEF DESCRIPTION OF THE DRAWINGS

To describe the embodiments of the present disclosure or the technical solutions in the related art more clearly, the accompanying drawings required in the embodiments are briefly introduced below. Obviously, the accompanying drawings described below are only some embodiments of the present disclosure. Those of ordinary skill in the art may further obtain other accompanying drawings based on these accompanying drawings without creative labor.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide a bending angle detection method and system for tube bending and an electronic device, so as to provide a bending angle detection method and system which is cost-effective and has high efficiency and strong universality.

The embodiments of the present disclosure are further described in detail below with reference to the drawings.

Embodiment 1

The embodiment of the present disclosure provides a bending angle detection method for tube bending, including the following steps.

A to-be-recognized image is binarized and an ROI is extracted from the to-be-recognized image to obtain binary images of two linear segment regions. The to-be-recognized image is an image of a bent tube.

A bending angle is calculated according to the binary images of the two linear segment regions.

Figure 1:
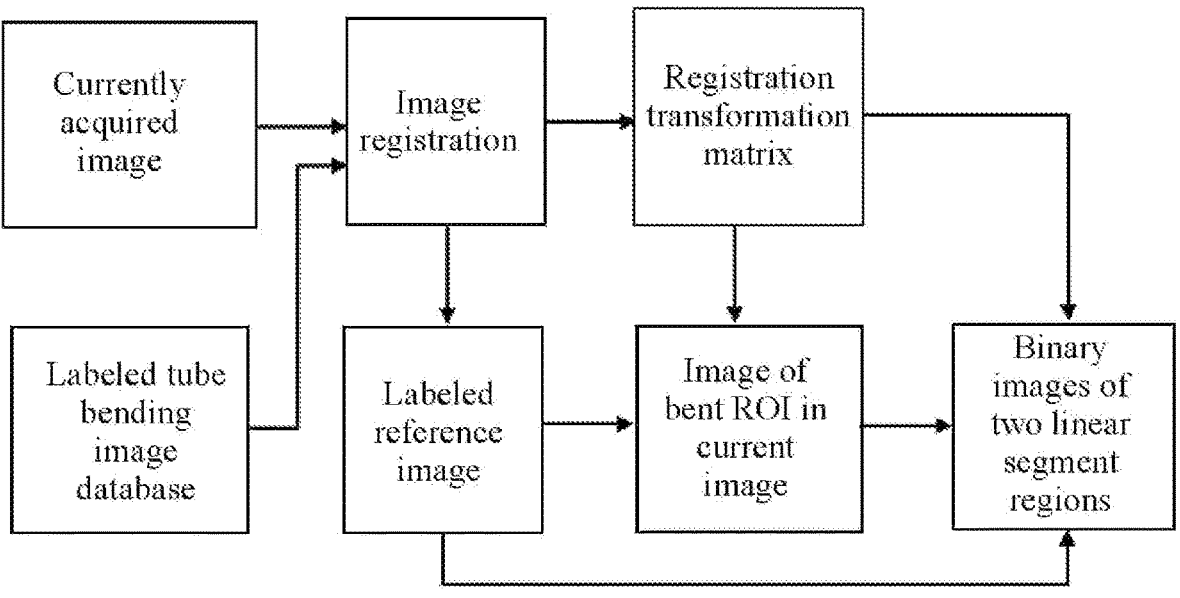
FIG. 1 is a flow chart of image processing provided by an embodiment of the present disclosure.

There are many methods for binarizing a to-be-recognized image and extracting an ROI, such as edge detection and neural network model, but they are not suitable for the extraction of linear segment regions in the tube bending process. As shown in FIG. 1, in the embodiment of the present disclosure, a process of binarizing a to-be-recognized image and extracting an ROI to obtain binary images of two linear segment regions specifically includes the following sub-steps.

The to-be-recognized image is registered with a sample image in a tube bending image database to obtain a registration transformation matrix. The tube bending image database includes a sample image obtained after each bending and translation in a tube bending process, and the sample image includes: a reference image, a labeled bent ROI, and two linear segment regions adjacent to current bending.

Coordinates of the bent ROI and the two linear segment regions adjacent to the current bending in the sample image are transformed using the transformation matrix to obtain a bent ROI and two linear segment regions adjacent to current bending in the to-be-recognized image.

The bent ROI in the to-be-recognized image is intercepted from the to-be-recognized image to obtain an image of the bent ROI, and the image of the bent ROI is binarized to obtain a binary image of the bent ROI.

The two linear segment regions adjacent to the current bending in the to-be-recognized image are intercepted from the binary image of the bent ROI to obtain binary images of the two linear segment regions.

Figure 2:
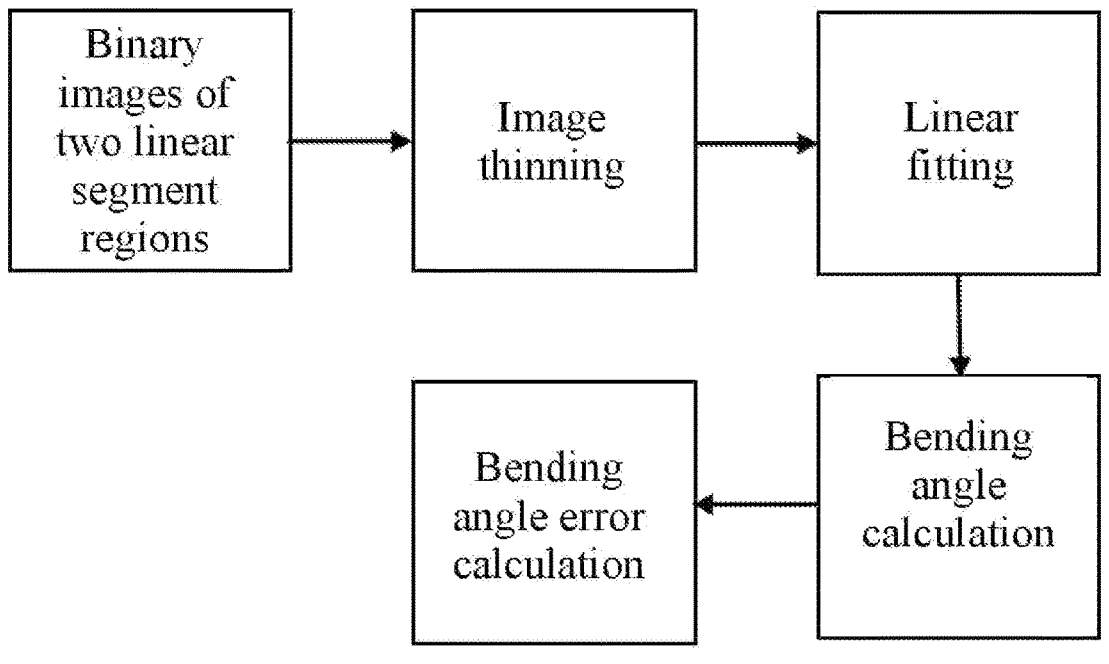
FIG. 2 is a flow chart of bending angle analysis provided by the embodiment of the present disclosure.

As shown in FIG. 2, a process of calculating a bending angle according to the binary images of the two linear segment regions specifically includes the following sub-steps.

The image of the two linear segment regions is thinned.

Linear fitting is performed on two thinned pixel coordinates to obtain linear equations of two line segments.

An included angle between the two line segments is calculated according to the linear equations of the two line segments to obtain the bending angle.

Embodiment 1 of the present disclosure further provides a bending angle detection system for tube bending, including: an image processing module and a bending angle analysis module.

The image processing module is configured to binarize a to-be-recognized image and extract an ROI to obtain binary images of two linear segment regions. The to-be-recognized image is an image of a bent tube.

The image processing module includes: a registration unit, a coordinate transformation unit, a bent ROI image extraction unit, a binarization unit, and a two linear segment region binary image extraction unit.

The registration unit is configured to register the to-be-recognized image with a sample image in a tube bending image database to obtain a registration transformation matrix. The to-be-recognized image is an image of a bent tube, the tube bending image database includes a sample image obtained after each bending and translation in a tube bending process, and the sample image includes: a reference image, a labeled bent ROI, and two linear segment regions adjacent to current bending.

The coordinate transformation unit is configured to transform coordinates of the bent ROI and the two linear segment regions adjacent to the current bending in the sample image using the transformation matrix to obtain a bent ROI and two linear segment regions adjacent to current bending in the to-be-recognized image.

The bent ROI image extraction unit is configured to intercept the bent ROI in the to-be-recognized image from the to-be-recognized image to obtain an image of the bent ROI.

The binarization unit is configured to binarize the image of the bent ROI to obtain a binary image of the bent ROI.

The two linear segment region binary image extraction unit is configured to intercept the two linear segment regions adjacent to the current bending in the to-be-recognized image from the binary image of the bent ROI to obtain binary images of the two linear segment regions.

The bending angle analysis module is configured to calculate a bending angle according to the binary images of the two linear segment regions.

The bending angle analysis module specifically includes: a thinning unit, a linear fitting unit, and a bending angle calculation unit.

The thinning unit is configured to thin the image of the two linear segment regions.

The linear fitting unit is configured to perform linear fitting on two thinned pixel coordinates to obtain linear equations of two line segments.

The bending angle calculation unit is configured to calculate an included angle between the two line segments according to the linear equations of the two line segments to obtain the bending angle.

Embodiment 1 of the present disclosure further provides an electronic device, including a memory arranged at each participant, a processor arranged at each participant, and a computer program stored on the memory and executable on the processor. When the processor executes the computer program, the above detection method is implemented.

Embodiment 2

Figure 3:
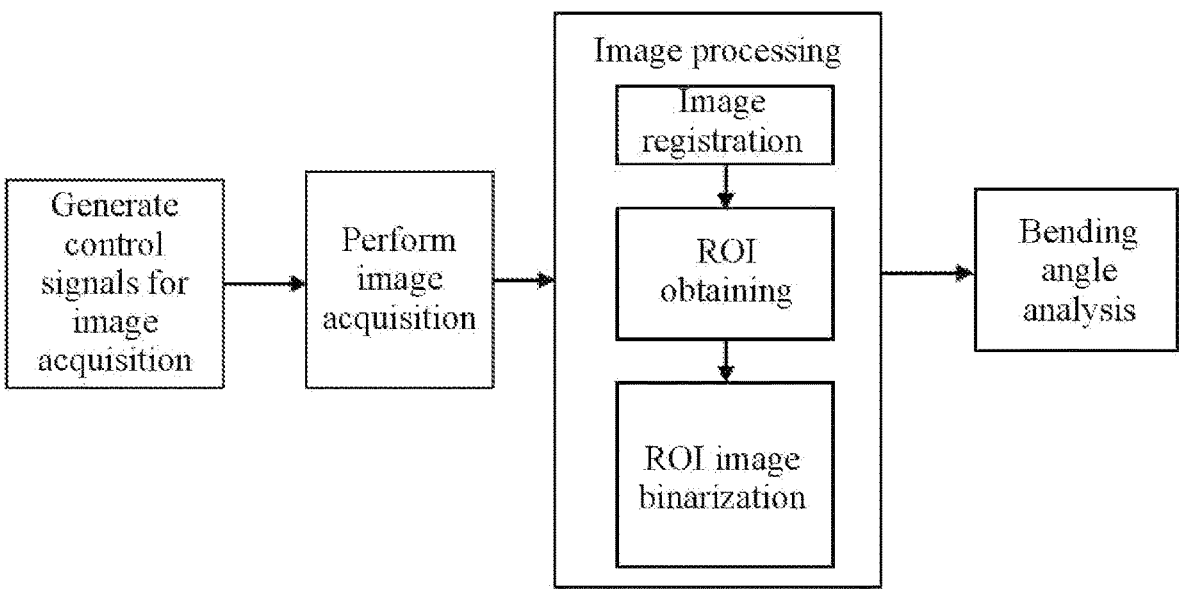
FIG. 3 is a flow chart of an online detection method for tube bending provided by the embodiment of the present disclosure.

Embodiment 2 of the present disclosure provides an online detection method for tube bending, as shown in FIG. 3, including the following steps.

Control signals of tube bending are obtained from a control end of tube bending equipment.

Whether image acquisition conditions are met is determined according to the control signals. The image acquisition conditions are that two adjacent control signals are bending and translation, and translation movement is ended.

The method returns to the step of "obtaining control signals of tube bending from a control end of tube bending equipment" when the image acquisition conditions are not met.

An image of a bent tube is acquired as a to-be-recognized image when the image acquisition conditions are met.

A bending angle is determined based on the to-be-recognized image using the above detection method.

The bending angle is compared with a bending angle required by a tube bending technology to obtain a bending angle error.

The bending angle error is fed back to a control system of the tube bending equipment to adjust processing parameters.

A process of acquiring an image of a bent tube as a to-be-recognized image specifically includes the following sub-steps.

A position of an optical camera is adjusted by an electronic control base, such that the optical camera is capable of obtaining an image containing a bent tube.

Control signals of tube bending are obtained from a control end of tube bending equipment.

Whether image acquisition conditions are met is determined. If two adjacent control signals are bending and translation, and translation movement is ended, the image acquisition conditions are met, otherwise, the image acquisition conditions are not met.

Control signals for image acquisition are generated. If the image acquisition conditions are met, control signals for image acquisition are generated.

Image acquisition is performed, and the image is saved in a storage media.

Figure 4:
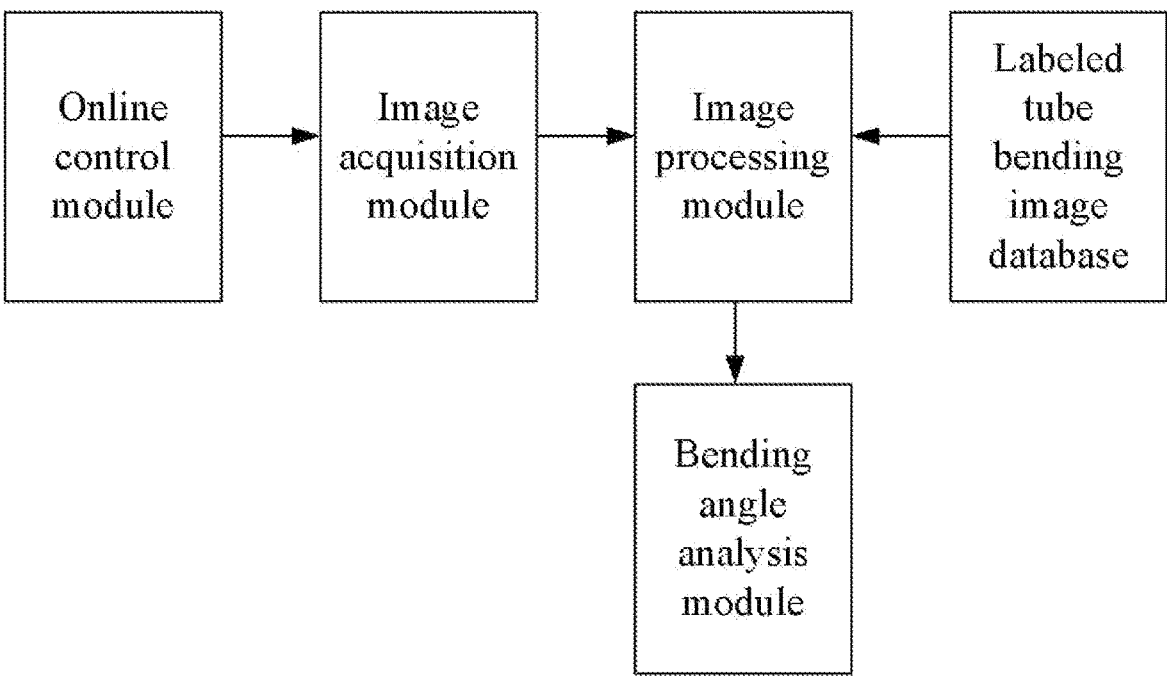
FIG. 4 is a structural diagram of an online detection system for tube bending provided by the embodiment of the present disclosure.

The embodiment of the present disclosure further provides an online detection system for tube bending. As shown in FIG. 4, the online detection system includes: an online control module, an image acquisition module, an image processing module, a bending angle analysis module, and an error feedback module. The online control module receives control signals from tube bending equipment, distinguishes the control signal logic, generates control signals for image acquisition, and sends them to the image acquisition module. The image acquisition module acquires an image of a tube bending site. The image processing module processes the acquired image to obtain an image of a current bending region. The bending angle analysis module processes the image of the ROI to obtain a bending angle and a bending angle error, and sends them to the control end of the tube bending equipment.

Figure 5:
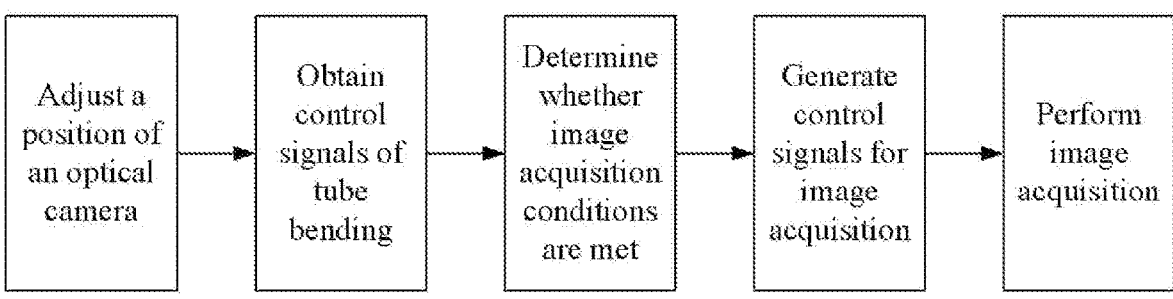
FIG. 5 is a flow chart of image acquisition provided by the embodiment of the present disclosure.

As shown in FIG. 5, a process of image acquisition specifically includes the following steps.

A position of an optical camera is adjusted by an electronic control base, such that the optical camera is capable of obtaining an image containing a bent tube.

Control signals of tube bending are obtained from a control end of tube bending equipment.

Whether image acquisition conditions are met is determined. If two adjacent control signals are bending and translation, and translation movement is ended, the image acquisition conditions are met, otherwise, the image acquisition conditions are not met.

Control signals for image acquisition are generated. If the image acquisition conditions are met, control signals for image acquisition are generated.

Image acquisition is performed, and the image is saved in a storage media.

As shown in FIG. 1, a process of image processing includes the following steps.

The current image is registered with an image in a labeled tube bending image library to obtain an optimally matched labeled reference image and an image registration transformation matrix.

According to the transformation matrix and the labeled reference image, a bent ROI and two linear segment regions in the currently acquired image are obtained.

An image of the bent ROI in the currently acquired image is binarized, and binary images of the two linear segment regions are obtained according to the two linear segment regions in the currently acquired image.

As shown in FIG. 2, a process of bending angle analysis includes the following steps.

Image thinning is performed on the binary images of the two linear segment regions.

Linear fitting is performed on the thinned two linear segment regions to obtain two linear equations.

An included angle between the lines is calculated according to the two linear equations, that is, the bending angle.

The calculated bending angle is compared with a bending angle required by a tube bending technology to calculate a bending angle error.

The embodiment of the present disclosure acquires the image after each bending, registers it with the image in the image database, determines two line segment regions adjacent to the bending region, obtains linear equations of the two line segments by image processing, and obtains an actual bending angle, which can effectively improve the quality of the bent tube and timely grasp the tube bending conditions, and has the characteristics of cost-effectiveness, high efficiency and strong versatility.

The embodiments of the present disclosure are described above with reference to the accompanying drawings, but the present disclosure is not limited to the foregoing specific implementations. The foregoing specific implementations are merely illustrative rather than restrictive. Under the teaching of the present disclosure, those of ordinary skill in the art may make many variations without departing from the spirit of the present disclosure and the protection scope of the claims, and all such variations fall within the protection scope of the present disclosure.

What is claimed is:

1. An online bending angle detection method for tube bending, comprising the following steps:

obtaining control signals of tube bending from a control end of a tube bending equipment;

determining whether an image acquisition condition is met according to the control signals, wherein the image acquisition condition is that two adjacent control signals are bending and translation respectively, and translation movement is ended;

returning to the step of "obtaining control signals of tube bending from a control end of tube bending equipment" in response to that the image acquisition condition is not met;

acquiring an image of a bent tube as a to-be-recognized image in response to that the image acquisition condition is met;

binarizing the to-be-recognized image and extracting a region of interest (ROI) to obtain binary images of two linear segment regions, wherein the to-be-recognized image is an image of a bent tube; and calculating a bending angle according to the binary images of the two linear segment regions;

wherein a process of binarizing a to-be-recognized image and extracting an ROI to obtain binary images of two linear segment regions specifically comprises:

registering the to-be-recognized image with a sample image in a tube bending image database to obtain a registration transformation matrix, wherein the tube bending image database comprises a sample image obtained after each bending and translation in a tube bending process, and the sample image comprises: a reference image, a labeled bent ROI, and two linear segment regions adjacent to current bending;

transforming coordinates of the bent ROI and the two linear segment regions adjacent to the current bending in the sample image using the transformation matrix to obtain a bent ROI and two linear segment regions adjacent to current bending in the to-be-recognized image;

intercepting the bent ROI in the to-be-recognized image from the to-be-recognized image to obtain an image of the bent ROI, and binarizing the image of the bent ROI to obtain a binary image of the bent ROI; and intercepting the two linear segment regions adjacent to the current bending in the to-be-recognized image from the binary image of the bent ROI to obtain binary images of the two linear segment regions.

2. The online bending angle detection method for tube bending according to claim 1, wherein a process of calculating a bending angle according to the binary images of the two linear segment regions specifically comprises:

thinning the image of the two linear segment regions;

performing linear fitting on two thinned pixel coordinates to obtain linear equations of two line segments; and calculating an included angle between the two line segments according to the linear equations of the two line segments to obtain the bending angle.

3. An online bending angle detection system for tube bending, comprising:

an online control module configured to perform steps of:

obtaining control signals of tube bending from a control end of tube bending equipment;

determining whether an image acquisition condition is met according to the control signals, wherein the image acquisition condition is that two adjacent control signals are bending and translation respectively, and translation movement is ended; and returning to the step of "obtaining control signals of tube bending from a control end of tube bending equipment" in response to that the image acquisition condition is not met;

an image acquisition module configured to acquire an image of a bent tube as a to-be-recognized image in response to that the image acquisition condition is met;

an image processing module configured to binarize the to-be-recognized image and extract an ROI to obtain binary images of two linear segment regions, wherein the to-be-recognized image is an image of a bent tube; and a bending angle analysis module configured to calculate a bending angle according to the binary images of the two linear segment regions;

wherein the image processing module comprises:

a registration unit configured to register the to-be-recognized image with a sample image in a tube bending image database to obtain a registration transformation matrix, wherein the to-be-recognized image is an image of a bent tube, the tube bending image database comprises a sample image obtained after each bending and translation in a tube bending process, and the sample image comprises: a reference image, a labeled bent ROI, and two linear segment regions adjacent to current bending;

a coordinate transformation unit configured to transform coordinates of the bent ROI and the two linear segment regions adjacent to the current bending in the sample image using the transformation matrix to obtain a bent ROI and two linear segment regions adjacent to current bending in the to-be-recognized image;

a bent ROI image extraction unit configured to intercept the bent ROI in the to-be-recognized image from the to-be-recognized image to obtain an image of the bent ROI;

a binarization unit configured to binarize the image of the bent ROI to obtain a binary image of the bent ROI; and a two linear segment region binary image extraction unit configured to intercept the two linear segment regions adjacent to the current bending in the to-be-recognized image from the binary image of the bent ROI to obtain binary images of the two linear segment regions.

4. The online bending angle detection system for tube bending according to claim 3, wherein the bending angle analysis module specifically comprises:

a thinning unit configured to thin the image of the two linear segment regions;

a linear fitting unit configured to perform linear fitting on two thinned pixel coordinates to obtain linear equations of two line segments; and a bending angle calculation unit configured to calculate an included angle between the two line segments according to the linear equations of the two line segments to obtain the bending angle.

5. An electronic device, comprising a memory arranged at each participant, a processor arranged at each participant, and a computer program stored on the memory and executable on the processor, wherein when the processor executes the computer program, the detection method according to claim 1 is implemented.

6. The electronic device according to claim 5, wherein a process of binarizing a to-be-recognized image and extracting an ROI to obtain binary images of two linear segment regions specifically comprises:

registering the to-be-recognized image with a sample image in a tube bending image database to obtain a registration transformation matrix, wherein the tube bending image database comprises a sample image obtained after each bending and translation in a tube bending process, and the sample image comprises: a reference image, a labeled bent ROI, and two linear segment regions adjacent to current bending;

transforming coordinates of the bent ROI and the two linear segment regions adjacent to the current bending in the sample image using the transformation matrix to obtain a bent ROI and two linear segment regions adjacent to current bending in the to-be-recognized image;

intercepting the bent ROI in the to-be-recognized image from the to-be-recognized image to obtain an image of the bent ROI, and binarizing the image of the bent ROI to obtain a binary image of the bent ROI; and intercepting the two linear segment regions adjacent to the current bending in the to-be-recognized image from the binary image of the bent ROI to obtain binary images of the two linear segment regions.

7. The electronic device according to claim 5, wherein a process of calculating a bending angle according to the binary images of the two linear segment regions specifically comprises:

thinning the image of the two linear segment regions;

performing linear fitting on two thinned pixel coordinates to obtain linear equations of two line segments; and calculating an included angle between the two line segments according to the linear equations of the two line segments to obtain the bending angle.

\* \* \* \* \*